(No Model.)  5 Sheets—Sheet 1.

J. P. GILL.
PROCESS OF AND APPARATUS FOR MANUFACTURING AND DELIVERING GASES AND VAPORS.

No. 284,002.  Patented Aug. 28, 1883.

Attest:
Wm H Grenelle
Walter Donaldson

Inventor
Joseph Pearson Gill (No Model.)

J. P. GILL.

PROCESS OF AND APPARATUS FOR MANUFACTURING AND DELIVERING GASES AND VAPORS.

No. 284,002.

5 Sheets—Sheet 2.

Patented Aug. 28, 1883.

Attest:
Wm H Grenelle
Walter Donaldson

Inventor
Joseph Pearson Gill (No Model.)
5 Sheets—Sheet 3.
J. P. GILL.
PROCESS OF AND APPARATUS FOR MANUFACTURING AND DELIVERING GASES AND VAPORS.
No. 284,002. Patented Aug. 28, 1883.
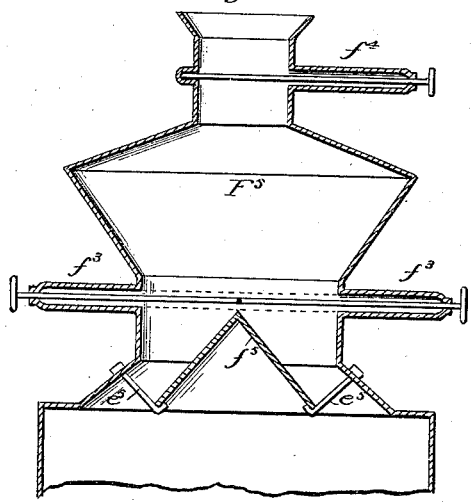
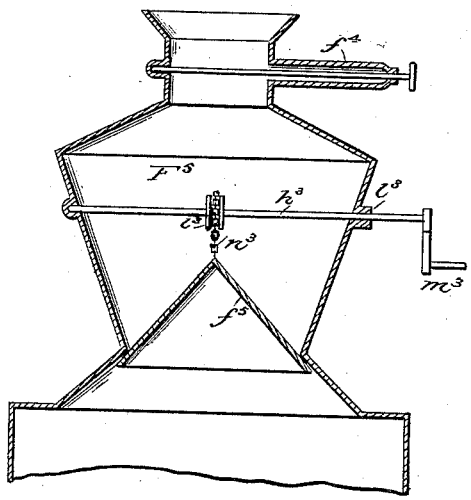

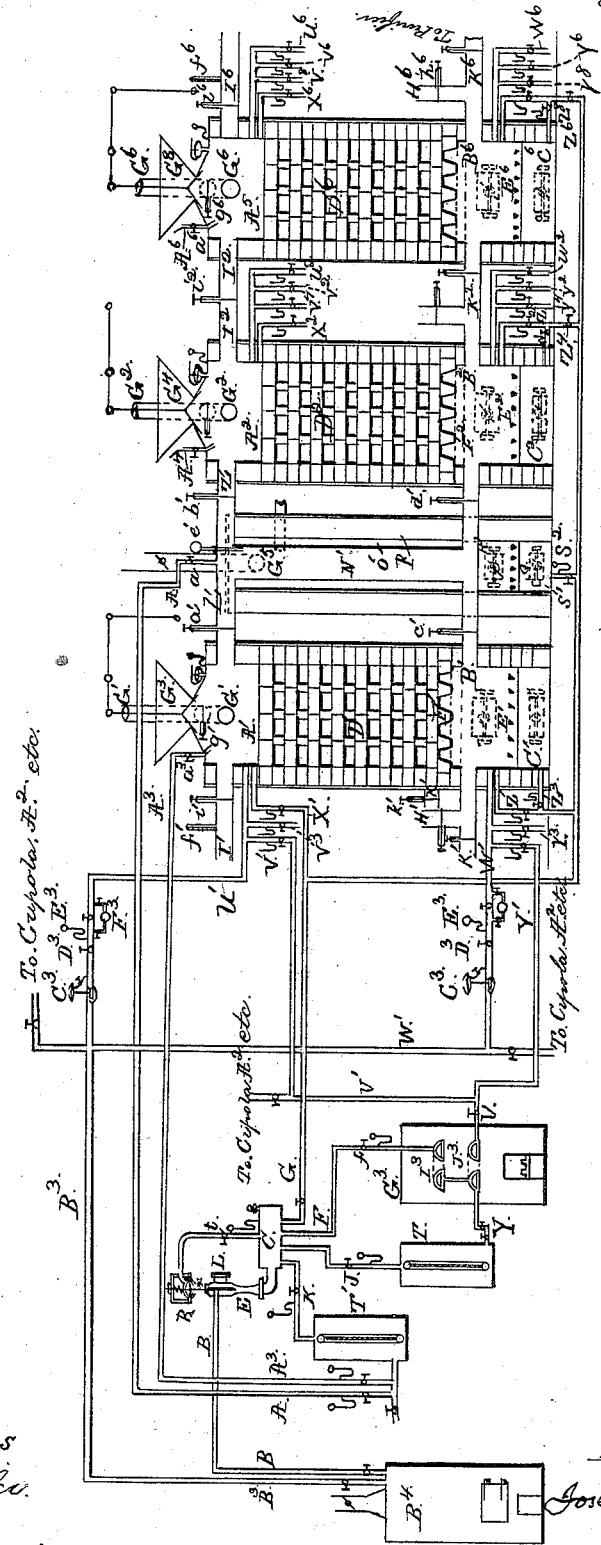

(No Model.) 5 Sheets—Sheet 5.
J. P. GILL.
PROCESS OF AND APPARATUS FOR MANUFACTURING AND DELIVERING GASES AND VAPORS.
No. 284,002. Patented Aug. 28, 1883.
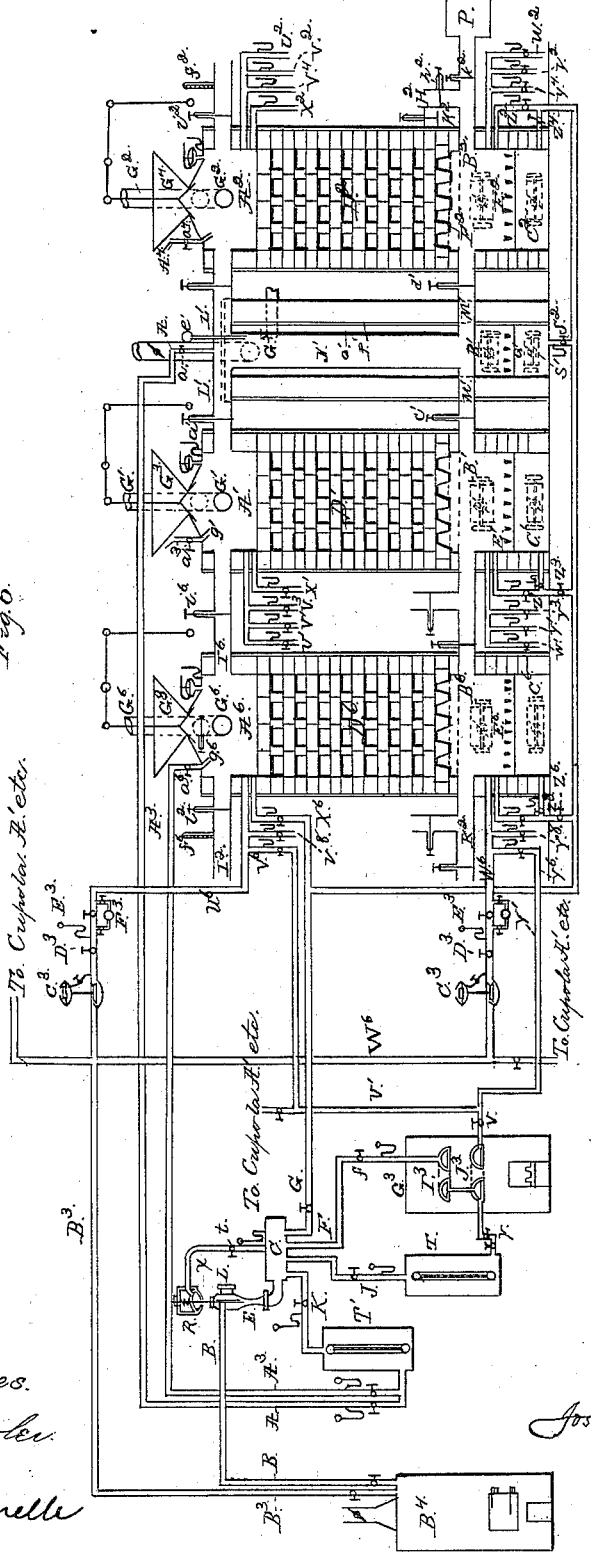

UNITED STATES PATENT OFFICE.

JOSEPH PEARSON GILL, OF NEW YORK, N. Y.

PROCESS OF AND APPARATUS FOR MANUFACTURING AND DELIVERING GASES AND VAPORS.

SPECIFICATION forming part of Letters Patent No. 284,002, dated August 28, 1883.

Application filed June 29, 1883. (No model.)

*To all whom it may concern:*

Be it known that I, JOSEPH PEARSON GILL, of the city, county, and State of New York, have invented certain new and useful improvements in processes and apparatus used in the manufacture of gases and vapors for illuminating and heating purposes, and for the treatment of minerals, ores, and metals; and I do hereby declare that the following is a full, clear, and exact description of the invention, which will enable others skilled in the art to which it pertains to make and use the same, reference being had to the accompanying drawings, and to the letters of reference marked thereon, which form part of this specification.

My invention is an improvement in processes and apparatus for manufacturing and delivering illuminating and non-illuminating gases and vapors for lighting and heating purposes, and for the treatment of minerals, ores, and metals and manufactures of metals.

The principal object of my invention is to simplify the apparatus and to enlarge its capacity, so that the same apparatus may be used in various ways, with various materials, and varied results, accomplishing what has been heretofore accomplished only by many different sets of independent apparatus; further, my object is to simplify and improve the process of treating gases and vapors.

My apparatus is fully described hereinafter, and the general principle thereof, as well as the details and the methods of use, are particularly indicated in the claims.

Figure 1:
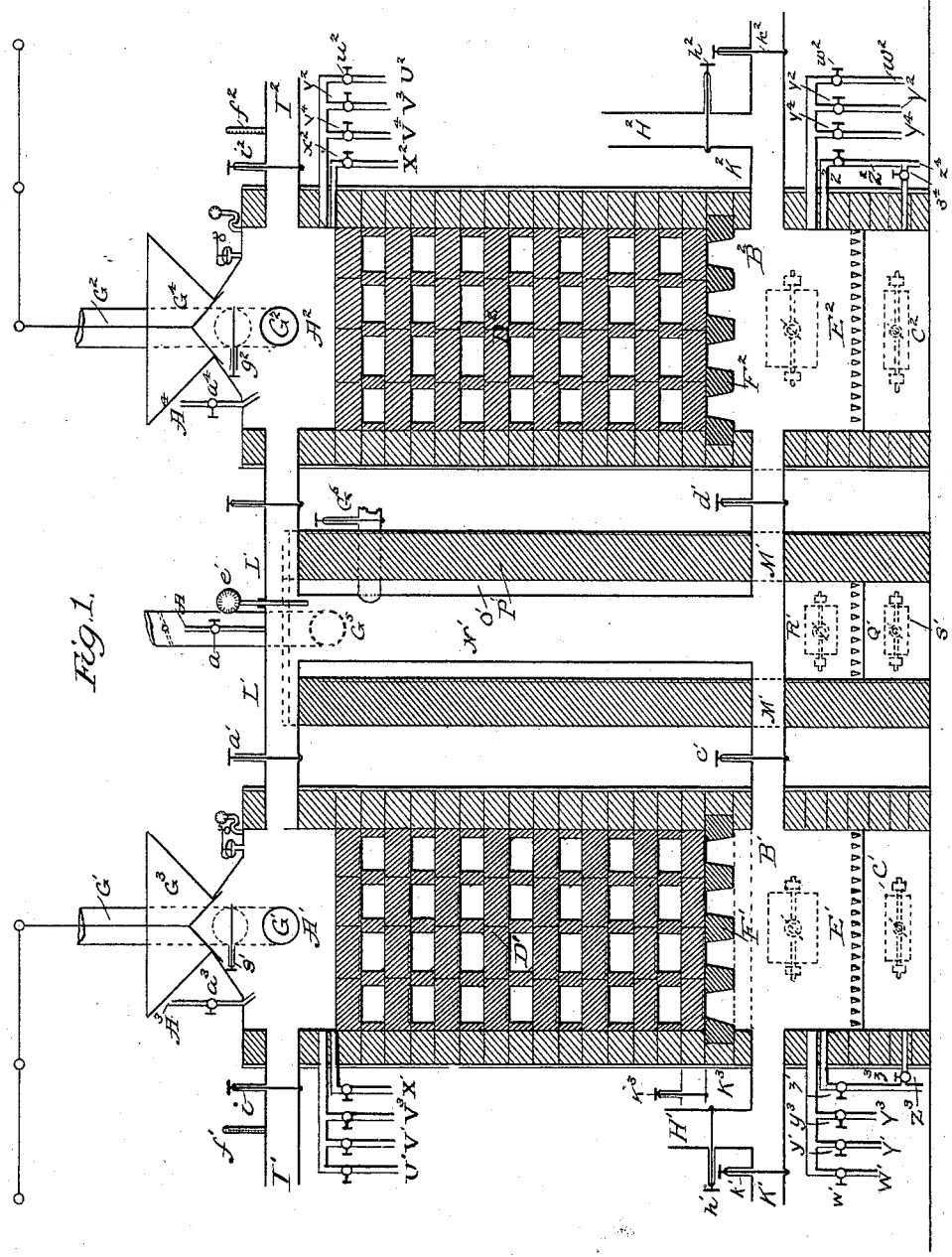
Figure 2:
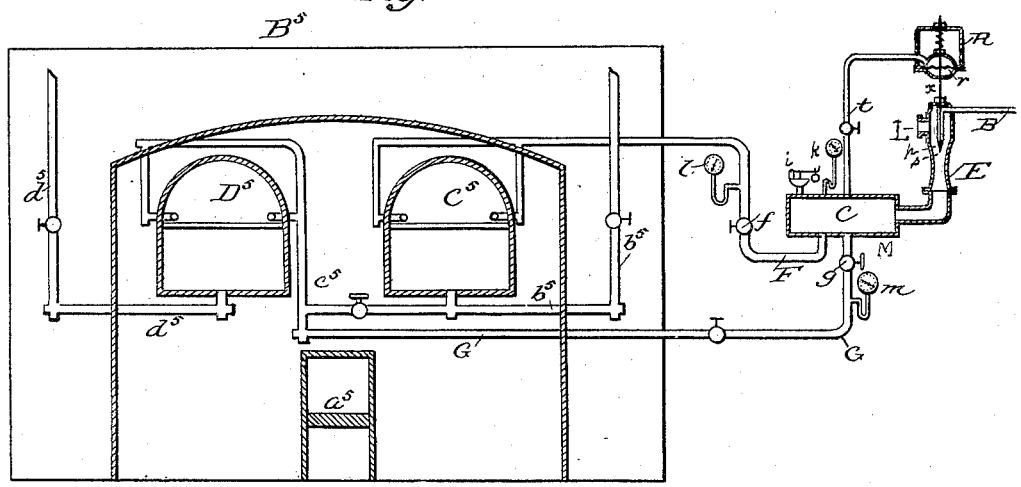

My apparatus is illustrated in the accompanying drawings, in which Figure 1 shows a central vertical section of the twin cupolas and their vaporizers with pipe-connections. Fig. 2 represents, partly in cross-section and partly in elevation, the improved forcing and regulating apparatus as applied to the horizontal form of retort. Figs. 3 and 4 show vertical sections of the hopper and chute with their valves. Fig. 5 shows in section similar to Fig. 1 the twin cupolas and vaporizer with a third cupola added to the rear of the apparatus. Fig. 6 shows a like section of the twin cupolas and vaporizer with a third cupola added to the front of the apparatus, these last two figures showing the connections with my improved regulating and forcing devices, which devices and connections are shown on an enlarged scale and somewhat distorted in position as well as in proportion.

The principal elements in the apparatus are the two cupolas A' and A². These are constructed with an exterior shell of wrought or cast iron for the purpose of giving them the required strength, and they are made gas and steam tight throughout, and lined with fire-brick or other suitable material. The cupola A' is provided with a combustion-chamber, B', having gas-tight door, fire-bars E', and ash-pit C', having also gas-tight door. The interior of the cupola (marked D') is adapted to be filled, in whole or in part, with metallic, mineral, or carbonaceous material, which rests upon the fire-proof perforated support or grate F', placed over the combustion-chamber B'. In the top of the cupola is a smoke-flue, G', having a gas-tight valve, $g'$, and the upper portion of the cupola is also provided with a pipe, I', having valve $i'$ for the passage of gas, air, and vapors. A pipe, K', opens preferably into the combustion-chamber B'; but it may open into the cupola above the perforated grating, at the point K³, if desired. The pipe K' is provided with a valve, $k'$, and between this valve and the cupola is a branch, H', provided with a valve, $h'$, for carrying off the products of combustion whenever that may be required.

As the cupola, in the various uses to which it is put, is sometimes required to contain incombustible material and sometimes combustible material, the perforated grating is adapted to support either the one or the other.

In the drawings I have shown fire-brick regularly placed; but any similar or suitable incombustible material may be used instead, which may be loosely placed therein, so as to allow the gases, vapors, or products of combustion to pass through. The top of the cupola is constructed to permit the introduction or removal of any of these materials, and at the same time to maintain the whole cupola in a gas and steam tight condition.

When coal is used in the cupola, it may be necessary to introduce it while the apparatus is in operation, and to meet all the requirements of the case I have provided a hopper, (shown at G³,) which communicates directly with the interior of the cupola through the top thereof.

In Fig. 3 is shown a hopper, F⁵, adapted to contain a charge of coal or other material. It is provided with a valve, $f^3$, which may fit loosely, and on which the coal is first placed. Above it is a tight-fitting valve, $f^4$, and below it is a distributing-chute, $f^5$, in the form of a cone. This valve is held in position by means of rods $e^5$, leaving an annular space, so that the coal or other material dropped by the opening of the valve $f^3$ next above is spread and distributed within the cupola. The upper valve, $f^4$, is opened when the material is to be introduced into the hopper, the cupola being in operation, and then closed, the lower one being opened, when required, to admit the coal to the cupola.

For cupolas of large dimensions I may use the form of hopper and chute shown in Fig. 4. The hopper is therein represented at F⁵, $f^5$ being a conical distributing-chute, which is raised, lowered, or held by means of a shaft and chain. The shaft has gas-tight bearings in the walls of the hopper, that at the point $l^3$ being a stuffing-box, and the crank $m^3$ on the outside. It is provided with a grooved pulley, $i^3$, in the center of the hopper, (in the direction of the length of the bar,) the pulley being in circumference somewhat greater than the distance through which the distributer must drop to deliver the coal. The shaft crosses the hopper at a distance from the center equal to the semi-diameter of the pulley. A chain, $n^3$, passes around the pulley and is fastened to the top of the distributer. The edge of the pulley being always in the center of the hopper, the chute will always move up and down in the axial line of the hopper. A gas-tight valve, $f^4$, is placed above, to allow the hopper to be filled and the intermediate valve is dispensed with. A pawl is provided to keep the shaft from turning when the distributing-valve is to be held up.

The second cupola is in all respects like that heretofore described, and corresponding parts are marked with the same letter, these letters being distinguished from the first by the figure 2. The cupolas A' and A² are connected near their tops by a pipe, L', and at points below the perforated gratings F' F² by a pipe, M', these pipes having suitable valves, $a'$ $b'$ $c'$ $d'$. Between the two cupolas, and in connection with the pipes L' M', is a vertical chamber or vaporizer, N', which is surrounded by firebrick and metallic casing, or any suitable casing, leaving an annular space, O', between the fire-brick and the vaporizer N'. The outlet G⁵ communicates with the space O' for the passage of the products of combustion from an independent fire-chamber over the grate-bars Q, above the ash-pit. The fire-chamber marked R' is adapted to be used with coal, vapors, or gas for heating the vaporizing-chamber through the annular space. This vaporizer N' has combined with its top a pipe, A, with valve $a$, for the admission of hydrocarbon liquids to be vaporized therein. It has also an outlet-pipe (not shown on the drawings) similar to G⁵, but communicating with the interior of the vaporizer, for the passage of the vapors produced therein when so required. This vaporizer is a dry vaporizer, in which no liquid is allowed to collect, as the hydrocarbon liquid is vaporized, taken up, and removed by the steam or heated air as fast as it is permitted to enter the said vaporizer. The vaporizer has attached to it a pyrometer, by means of which the temperatures required to vaporize liquids of different specific gravities, boiling-points, and points of destructive distillation are indicated, changed, and maintained according to the character of the liquids to be vaporized.

It will be observed that the second cupola is provided with pipes K², H², and I², corresponding exactly with K', H', and I' on the first cupola, and that it is immaterial, so far as the construction of the cupolas is concerned, which way they are worked, whether from A' to A² or from A² to A'.

I have described the construction of the cupolas and their adjuncts, whereby they may be heated or the products of combustion passed from one to the other or passed out. I proceed now to describe the pipes for the admission of steam, gas, vapor, or air, either above or below. Four sets of pipes are provided, as shown on the right and left hand sides of Fig. 1, above and below. Description of one set above and one below will suffice for both sets. One set on each cupola communicates to the upper part and one set to the lower, above the fire-grate, into the combustion-chamber. Into one pipe, communicating with the interior of the cupola at the points indicated above, four pipes, U', V', V³, and X', supply the upper parts of the cupolas. The pipe U', with valve $u'$, is for the admission of steam. The pipe V', with valve $v'$, is for the admission of carbonaceous vapors mixed with steam or heated air. The pipe V³, with valve $v^3$, is for the admission of gas, and the pipe X', with the valve $x'$, is for the admission of air. These pipes supply all the materials to be operated upon to the upper part of the cupola, excepting the oil, naphtha, or other hydrocarbon liquids, which are introduced into the upper part of the cupola through the pipe A³ in cupola A' and A⁴ in cupola A², these pipes being arranged to drop the liquid upon the incandescent material within the cupolas. The pipes for introducing the gases or vapors below are as follows: The pipe W', with valve $w'$, is for the admission of steam into the combustion-chamber B'. Pipe Y', with valve $y'$, admits carbonaceous vapors mixed with steam or heated air. Pipe Y³, with valve $y^3$, is for the admission of gas, and pipe Z', with valve $z'$, is for the admission of air, all these pipes, excepting the pipes for the admission of air, preferably connecting with the main pipe, which leads directly to the combustion-chamber. The pipe Z' is provided with a branch, Z³, leading into the ash-pit C', whereby air may also be supplied to the burning fuel. The valve $z^3$ regulates the supply. Suitable pressure-gages and safety-valves are attached to the cupolas, and I also place thermometers $f'$ $f^2$ in connection with the pipes I' I². I connect, also, a pyrometer, $e'$, heretofore referred to, with the interior of the vaporizer N'. The valves, heretofore described, in the pipes L' and M' are located between the vaporizer and the cupolas. The modifications of the general apparatus shown in Figs. 5 and 6 are adapted to special operations, hereinafter described. The cupolas in their construction and connection are precisely the same as those hereinbefore described; but in the general arrangement shown in Fig. 5 the vaporizer is located between the second and third cupolas, while in Fig. 6 the vaporizer is between the first and second. As represented, a cupola is added on the left in Fig. 5 to the arrangement shown in Fig. 1, and in Fig. 6 a cupola is added on the right to the pair shown in Fig. 1. The operation of these modifications is hereinafter fully described.

For most of the purposes to which the apparatus is to be applied, the cupolas are filled with suitable non-combustible material, having preferably uniform and subdivided spaces, similar to those between cannon-balls when in pile, and the material rests upon the perforated grate F'. For ordinary purposes the two cupolas may be filled with the same kind of material—as, for example, with fire-bricks; but for a special purpose—as, for example, where a gas of less specific gravity is required—$A^2$ may be filled with pieces of iron, such as chains or perforated iron balls. The non-combustible materials in the cupolas are heated by the combustion of coal in the fire-chambers, air being admitted in regulated quantities through the pipe $Z^3$ in preference to a natural draft. Both cupolas may be heated simultaneously by fire on each grate, and the products of combustion supplied with air through pipe Z', above the fire-bed, may be completely consumed within the cupola and among the incombustible material. These products from the first cupola may be taken through the pipe L' and the vaporizer down to the pipe M' into the fire-chamber of the second cupola, and aid in heating the second; or the same products, if there be no fire upon the grate of the second cupola, may be conducted through the incombustible materials in that cupola and pass out through the smoke-stack $G^2$. If it be preferred to heat the cupolas by means of hydrocarbon vapors and air or hydrocarbon vapor and steam, these materials may be supplied through the pipes heretofore described, so that the apparatus may be used either with solid, vaporous, or gaseous fuel. As the air-pipes are arranged to admit air either above or below the grate, the proportions of air above and below may be regulated both absolutely and in relation to each other, so that the kind of heat adapted to the purpose had in view may be produced. If an intense concentrated heat be required, the air may be admitted below either wholly or in the larger proportion, to increase the combustion of the solid fuel; or, if a larger amount of flame and a more diffused heat be required, a smaller quantity of air may be introduced below the grate and a part of the air for the combustion be introduced above, whereby the unconsumed products generated from the solid fuel may be consumed in the fire-chamber and among the non-combustible material in the cupola. Further, by means of the valves in the air-pipes and by the pressure-gages, the precise amount of air required to unite with the carbon and produce perfect combustion without any excess of air may be determined and maintained. This capacity for variation in respect to intensity or diffusion has its uses in respect to the operation of the apparatus. If the purpose be simply to heat the incombustible material in the cupola, and thus prepare it to superheat air or steam, or to vaporize liquid hydrocarbon, or to act upon the mixed vapor as a fixing-retort, then the air will be admitted both below and above the grate, and the carbonaceous vapors and gases arising from the solid fuel would be consumed in their passage through the material in the cupola, heating them uniformly throughout; but if, on the other hand, it be desired to re-enforce the heat of the solid fuel on the grate by vapor fuel introduced in the upper part of the cupola, then an intense and concentrated heat may be caused in the fuel on the grate by the admission of air beneath the grate, without the introduction of air above the grate. In this case the direction of the current will be from the upper part of the cupola down through the incombustible material, over the fire-bed, and into the horizontal pipe M', and thence into the fire-chamber of the second cupola.

It will be understood that the cupolas are heated and used alternately—that is to say, by means of the fire upon the grate, or these fires and the heat from the hydrocarbon vapors, the incombustible materials within the cupola are brought into a properly-heated condition. Then the cupola is used either as a superheater or vaporizer or fixing-retort, or in any of the ways hereinafter explained, until the heat is so reduced that it needs to be renewed, which renewal of the heat is effected in the same way as at first, the proper valves being opened and closed to give direction to the current; and the current may be made to pass either outwardly through the cupola and across through the horizontal pipe L', or downward and across through the pipe M', and either upwardly or downwardly through the vaporizer, or upward or downward through the second cupola; or the current may be reversed and pass from the second cupola to the first in the same manner.

Having thus described the construction of the cupolas and their adjuncts and the general operation and direction of the currents in the generation of heat which is to prepare the cupolas for their action upon the various ma- terials used to produce gases or vapors, I now proceed to describe the various modes of operation for the production of the various gases and vapors which are required for lighting and heating purposes, or for the treatment of minerals, ores, or metals. It should be here premised that when steam alone is supplied to the cupolas it is brought directly from the generator or superheater, which are shown in the drawings in Figs. 5 and 6, which may be of ordinary construction; but when it is brought in connection with air, vapor, or gas, it is conveyed through the regulating and forcing devices shown in Figs. 2, 5, and 6. This regulating and forcing device is particularly described in another pending application, and needs no further description, as it is not herein claimed; but the gases and vapors supplied to the cupolas are all, excepting the steam when supplied directly, forced in accurately-regulated quantities into the cupolas by means of this automatically-regulated forcing device.

It will be understood that when the cupolas are referred to alone it is meant to include all their adjuncts, such as connecting-pipes, valves, gages, and regulating and forcing devices, which go to make the apparatus operative.

In order to make either illuminating or non-illuminating gas in the above-described apparatus, I use in the first cupola fire-brick or equivalent material placed loosely, the second cupola having preferably loosely-placed iron, and the intermediate vaporizer is provided with an oil-supply. Steam is turned on into the upper part of the first cupola, previously heated, and passes down through the brick, in which it is superheated. It then passes into the bottom of the vaporizer, and there meets and mingles with the vapor of the hydrocarbon; thence passes over into the top of the second cupola and down through the heated iron, where it is fixed, and forms a light illuminating or non-illuminating gas, according to the amount of hydrocarbon oil introduced to the vaporizer. The same process may be carried on in the same apparatus by introducing the steam into the bottom of the first cupola, passing it down through the vaporizer and up through the second cupola.

In order to produce a richer illuminating-gas, I bring into use the hydrocarbon-liquid-supply pipe in the top of the first cupola, and pass steam and the hydrocarbon liquid vaporized through the heated fire-brick of the first cupola, forming hydrogen and carbonic oxide, which is carried through the vaporizer, where it takes up another element of hydrocarbon vapor from oil therein introduced, and is passed over to the second cupola, in which are also the heated fire-brick, the gases and vapors therein being fixed to form an illuminating-gas. Instead of introducing steam and hydrocarbon liquid into the top of the first cupola, it is evident that a mixture of steam and hydrocarbon vapor may be thus introduced.

An illuminating or non-illuminating gas may also be made without the use of hydrocarbon liquid in the first cupola by placing therein upon the grating solid carbon, passing steam up through the same when incandescent, thence passing the product over to and through the vaporizer, where it takes up hydrocarbon liquid from the supply-pipe, and from the vaporizer is carried to the second cupola containing the heated fire-brick, passing through which it is converted into gas.

An illuminating or non-illuminating gas may be made in one cupola by bringing into requisition the steam and oil pipe and filling the cupola with the loose fire-brick. In this case the oil is vaporized by falling on the heated brick, and with the steam introduced above is passed down through the cupola, and emerges converted into hydrogen and carbonic oxide, which may be conducted to the desired point for storage or use.

Instead of the liquid hydrocarbon introduced into the upper part of the cupola and dropped upon the heated fire-brick, I may introduce the steam and hydrocarbon vapor mixed, and forced by the forcing and regulating apparatus directly to the cupola, and pass it through either to make an illuminating or non-illuminating gas in the manner heretofore described. This method is the preferable one in large works.

An illuminating-gas may also be made in the first cupola containing the heated fire-bricks by introducing a non-illuminating gas, which may be forced in proper and uniform quantities into the upper part of the cupola A', and there mixed with the vapor of the oil dropped and vaporized upon the fire-bricks, and the mingled gas and vapor passed through the fire-bricks will be converted into an illuminating-gas.

A non-illuminating gas may also be carbureted and converted into an illuminating-gas by using cupolas A' A² and the vaporizer. In this case both contain the heated fire-brick, and the non-illuminating gas is passed through from top to bottom of the first cupola, thence through the vaporizer, where it takes up the proper quantity of hydrocarbon vapor, and thence is passed into the top of the second cupola, and, passing through downward, is converted into an illuminating-gas.

A simple vapor may be made by the use of the first cupola and the steam-pipe, and the oil-supply pipe in the top of the cupola. In this case it is necessary to maintain the heat of the cupola below that required for the decomposition of the steam and hydrocarbon vapor. The oil is simply vaporized in the cupola, and is carried down by the steam, and passes out at the bottom of the cupola.

Vapor in like manner may be made by using the cupola A' and the vaporizer, steam being passed through the fire-bricks, and thence carried to the bottom of the vaporizer, and mixed with hydrocarbon vapor from the oil-supply through the pipe, and the mingled steam and hydrocarbon vapor thence conveyed to the point of use. The steam in this case is simply superheated in the first cupola.

A heating-vapor may also be produced by introducing steam into the bottom of the cupola A', passing it up through solid carbon in the same, heated only below the point of destructive distillation, and thence carrying the mingled steam and carbon vapors over to the top of the vaporizer, where it is mingled with an additional proportion of hydrocarbon vapor from oil introduced to the vaporizer, and from the bottom of the vaporizer the mingled vapors are passed to the point of use.

A vapor may also be made for lighting or heating by bringing into requisition the air-pipe with the cupola A' and the vaporizer. In this case the cupola contains the heated fire-brick. Air is passed through the fire-brick and heated, and thence is passed to the vaporizer, where it meets and mixes with the vaporized liquid hydrocarbon, and thence the mingled air and hydrocarbon vapors are passed to the points where they are to be used.

A mixture of carbonic oxide, nitrogen, and hydrogen vapor may be made by using the air-pipe in connection with the lower part of the cupola A', the vaporizer, and the oil-pipe above. In this case the air is passed up through the incandescent solid carbon in the cupola A', where it is converted into carbonic oxide and nitrogen. These gases are then passed over to the top of the vaporizer, where they are mingled with the vaporized hydrocarbon, and the commingled gases and vapor are thence passed to the point of consumption.

Pure hydrogen gas may be made in the apparatus in several ways by calling into use different parts thereof. First I use the cupolas A' A², steam and vapor pipe with the first and steam-pipe with the second, using fire-bricks in both. Steam and hydrocarbon vapor are introduced into the first cupola, passed down through the highly-heated bricks, and converted into hydrogen and carbonic oxide. These are passed through the top of the second cupola, to which steam is also admitted, and the mixture is thence passed down through the highly-heated bricks in the second cupola and converted into hydrogen and carbonic-acid gas. They are thence conveyed to the purifier P, (shown in Fig. 5,) where the carbonic-acid gas is removed, and the pure hydrogen is conveyed to the point of storage or use.

Gas may also be made by the same apparatus by simply changing the direction of the current through the cupolas, the steam and vapor being introduced at the bottom of the first cupola.

If it be desired to use oil instead of hydrocarbon vapor, I use the apparatus shown in Fig. 6, thus bringing into use three cupolas, all three being filled with fire-brick. This process is carried on by introducing steam into the top of the first cupola, passing it down through the heated bricks, thence to the top of the vaporizer, wherein it takes up the hydrocarbon vapors from the vaporized oil, thence is passed to the second cupola, where it is converted into hydrogen and carbonic oxide, and thence to the third cupola, in which it is mixed with steam and converted into hydrogen and carbonic-acid gas. It thence passes to the purifier P, where the carbonic-acid gas is removed and the hydrogen conveyed to points of storage or use.

The same process may be carried on in two cupolas filled with fire-bricks by introducing steam and oil into the top of the first cupola and steam into the second. In this case the fire-bricks in the first cupola are heated sufficiently to decompose the steam and hydrocarbon vapors from the oil dropped upon the bricks.

Hydrogen gas may also be produced without the use of liquid or vapor hydrocarbon by placing the solid carbon in the cupola A', and thence passing steam through the solid carbon brought to a state of incandescence, whereby hydrogen and carbonic oxide are produced. The mixed gases are conveyed directly to the top of the second cupola, which is filled with fire-brick, and there mixed with steam introduced into the top of the cupola. The commingled gases and steam are there converted into carbonic acid, nitrogen, and hydrogen, which are taken to the points of storage or use.

An illuminating or non-illuminating air-gas may be made by the use of the two cupolas A' A², filled with fire-bricks, by calling into use the air and oil pipes and the vaporizer. In this case air is introduced into the top of the cupola A', heated in passing through it, is thence taken to the vaporizer, where it takes up the vapor of the oil introduced therein, is thence passed into the top of the second cupola, and, passing downward therein through the highly-heated bricks, is converted into carbonic oxide, light carbureted hydrogen, and nitrogen, with an element of unconverted hydrocarbon vapor.

The same process may be carried on with a larger proportion of carbonic oxide in the result by using in the first cupola, A', incandescent solid carbon. In this case the lower air-pipe is brought into use. The air is passed up through the incandescent carbon and the carbonic oxide carried over to the vaporizer, where it takes up hydrocarbon vapor. It is thence passed to the second cupola containing the highly-heated fire-bricks, where it is converted into the same kind of gases, with a residuum of hydrocarbon vapor, as above described, except that there is an increase in the proportion of carbonic oxide.

The apparatus shown in Fig. 6 is used also to make an illuminating hydrogen gas. In this case the cupolas are all filled with fire-bricks or equivalent materials, and by means of the steam and hydrocarbon-vapor pipes these vapors are introduced in the cupola A⁶ and passed through the highly-heated bricks, and are converted into hydrogen and carbonic oxide; thence they are passed to the second cupola, A², meeting there with steam from the steam-pipe. The mingled gases and vapors are passed through highly-heated bricks in this cupola, and are converted into hydrogen and carbonic acid. These gases are passed through the vaporizer and take up vapors from the oil therein vaporized, and are thence passed through the third cupola, wherein further reactions take place and produce a mixture of hydrogen, light and heavy carbureted hydrogens, hydrocarbon vapors, and carbonic-acid gas. These are to be passed through the purifiers, wherein the carbonic acid is removed, and the illuminating hydrogen gas thence conveyed to the holder. This same process may be carried on in the apparatus shown in Fig. 5 by reversing the operations therein described.

Instead of the steam and oil introduced through the steam and oil pipes, as above described, I may use the pipe for the introduction of steam and hydrocarbon vapor with the same result; or I may use the same apparatus, removing from the cupola $A^6$ the incombustible material and substituting solid carbon therefor. I then pass the steam in at the bottom, which, in its passage through the incandescent carbon, produces hydrogen and carbonic oxide, which passes through the cupolas, vaporizer, and purifying apparatus, with the result before described.

A part of the apparatus may be used to make carbonic-oxide gas by using a single cupola filled with solid carbon, instead of fire-bricks. In this case the lower air-pipe is brought into requisition, and the carbon is raised to a state of incandescence. The air is passed up through the carbon and is converted into carbonic oxide and nitrogen.

Carbonic-oxide gas may also be made by means of a single cupola containing fire-bricks by bringing into use liquid-hydrocarbon-supply pipe and air-pipe. In this case the bricks are highly heated, and the air mixed with hydrocarbon vapor is passed down through, and is therein converted into carbonic oxide and nitrogen. The same result may of course be produced by using the air and hydrocarbon-vapor pipe under the same conditions.

The apparatus may be used for making a carbonic-acid gas by using the two cupolas, the first being filled with solid carbon. In this case the lower air-pipe of the first cupola is brought into use, and the air passed up through the incandescent carbon is converted into carbonic oxide and nitrogen. This is passed into the second cupola containing highly-heated fire-bricks, and the air-pipe of that cupola is brought into use. The commingled gases and air, being passed down through the bricks, is converted into carbonic acid and nitrogen, and thence removed to point of storage or use.

The same process may be carried on by introducing steam into the second cupola under the conditions just specified, instead of the air. The result is the same as that previously described, excepting that it will contain an element of hydrogen.

The apparatus may also be used to make nitrogen gas. In this case the modification shown in Fig. 6 is used, and all the cupolas are filled with incombustible material. By the upper air-pipe of cupola A', air is introduced into the upper part of the cupola, and is heated by its passage through the bricks, thence is conducted to the vaporizer, and, with the hydrocarbon vapor, is conducted to the cupola A², where it is converted into nitrogen and carbonic oxide. It is thence taken to the cupola $A^5$, which is in connection with its steam-pipe, and, passing with the steam through the highly-heated bricks, is converted into nitrogen, hydrogen, and carbonic acid. It is thence conveyed to a purifier, and the purified gases are conducted to the points of use or storage.

Nitrogen gas may also be made by the use of two cupolas, the first being filled with solid carbon and the air introduced by the lower air-pipe. It passes up through the incandescent carbon, and is thence taken to the second cupola containing the highly-heated bricks. The steam-pipe is in connection with that cupola, and the gases and steam are passed down through, and are converted into nitrogen, hydrogen, and carbonic acid, which are passed to the purifier in the same way. Instead of using the solid carbon in the first cupola, air and hydrocarbon vapor may be introduced by the air and vapor pipe in the upper part of the cupola and passed down through the heated bricks with the same result.

In my production of carbonic-oxide and carbonic-acid gases, in addition to the use of cupolas as herein described, I use horizontal retorts, as shown in Fig. 2, Sheet 2, in which $B^5$ represents a bench of horizontal retorts heated by a furnace, $a^5$. $C^5$ is one of the retorts for the manufacture of carbonic-oxide gas. $D^5$ is one of the retorts for the production of carbonic-acid gas. R is the regulator; E, the forcing device, and C the distributing-receiver. Retort $C^5$ is filled with anthracite coal or any similar solid hydrocarbon, and the retort $D^5$ with non-combustible mineral substances, through which the gas may pass. Air is conveyed by means of the pipe F to the retort $C^5$ in the proper proportion to convert the coal into carbonic-oxide gas by the union of the oxygen of the air with the carbon of the coal. If carbonic oxide is required for use, it is conveyed by means of pipe $b^5$ to a gas-holder or point of consumption. If carbonic-acid gas is required for use, the carbonic-oxide gas is conveyed by the pipe $c^5$ to the retort $D^5$, air being admitted at the same time from the receiver C through the pipe G in the proper proportion to convert the carbonic-oxide into carbonic-acid gas by the union of the oxygen of the air with it. During the passage of the mixed carbonic-oxide gas and air through the incandescent materials in $D^5$ carbonic-acid gas is produced, which is thence conveyed by means of the pipe $d^5$ to a gas-holder or point of consumption. In lieu of anthracite coal, hydrocarbon vapors may be employed by means of the apparatus shown in Letters Patent already granted to me, or by any form of apparatus for such purpose described in the present application.

In my use of cupolas A' and A² and of retorts C⁵ and D⁵ in the manufacture of gases and vapors I supply the materials used in the manufacture—such as steam, gas, air, vapors, or liquids—in definite quantities and relative proportions to obtain a product of given quality and quantity.

In order to obtain such results I use the methods and the automatically regulating and forcing devices described and illustrated in United States Letters Patent Nos. 179,475, 182,456, 182,457, 241,208, 275,634, 275,636, 275,635, and 275,761, both for the supply of the materials for manufacture and for consumption or use, connecting said devices to the gas-generators and to the furnaces by the proper connecting-pipes, valves, and pressure-gages, as also the regulating device R R', as described in United States Patent No. 275,634, and a similar device, also as set forth in United States Patents Nos. 241,208, 275,635, 275,636, and 275,761; or I may use the regulated forcing devices shown in Figs. 1 to 12, Sheets 1 and 2, in an application for patent now pending, marked "Division B," which are connected to the supply-pipes of the gas-generators, whether cupolas or retorts. This regulated forcing device is represented in Fig. 2 of the drawings, as follows: R, the regulating device with a flexible diaphragm, $r$; E, a forcing device for supplying the material used. B is a steam-pipe from a boiler, terminating in the point $p$. $s$ is a needle-valve passing through the point $p$, for regulating the size of the outlet. The movable diaphragm $r$ is connected with the valve $s$ by a rod, $x$. The forcing device E is connected by a suitable pipe, M, with a distributing-receiver, C. $t$ is a pipe with a valve, leading from the receiver C to the chamber above the movable diaphragm $r$ in the regulator R. L is a pipe or opening for the admission of the materials used into the forcing device. F and G are pipes with valves $f$ $g$, to convey the materials used from the receiver to the points of consumption. The receiver C is a chamber to receive the materials preparatory to distribution. It is of a larger diameter than the inlet-pipe leading to it, and has an area larger than the sum of the areas of all the distributing-pipes leading from it. This receiver, by the action of the pressure in it, which is communicated to the regulator R by means of the pipe $t$, forms an important part of the regulating apparatus.

If air is desired for use, the apparatus is operated as follows: Steam passing out of the pipe B at the point $p$ draws air through the pipe or opening L, and forces it into the distributing-receiver C, the amount of pressure caused by the air in the receiver being determined by the spring acting on the diaphragm $r$. If the pressure in the receiver is greater than that desired, being communicated to the movable diaphragm, it depresses it. This action of the diaphragm, by means of the rod $x$, causes the valve $s$ to partially close the steam-opening $p$. Less steam is thereby forced through, and consequently less air is forced into the receiver. If the pressure in C is below that required, the operation is reversed, the diaphragm $r$ rises by the tension of the spring on the flexible diaphragm, the valve $s$ allows more steam to pass through the opening $p$, and a larger quantity of air is forced into the receiver. By this action the pressure in the receiver C is uniformly maintained, whether one or all of the distributing-pipes are in use or not, and is not affected by any changes in the quantity of the air allowed to pass through them, the pressure of the steam at the point $p$ being uniformly that of the boiler, whether the valve $s$ is partially closed or not. When the distributing-pipes are all closed, the pressure in the receiver C, being communicated to the movable diaphragm $r$, closes the opening $p$, no more steam passes, and action ceases until one or more of the distributing-pipes are again opened. If dry air be required, a suitable condenser may be interposed between the forcing device E and the receiver C. If gas or vapor is required instead of air, it is admitted into the forcing device E through the pipe L, the operation being the same as before.

$i$ indicates a safety-valve attached to the receiver C, and $k$ a pressure-gage. $l$ is a pressure-gage on the pipe F. $m$ is a pressure-gage on the pipe G. By means of these gages the pressure in the respective pipes is always known, which is determined by the valves $f$ $g$. Thus the amount of air, gas, or vapor passing through the pipes is known by the pressure and by the size and length of the pipes. I thus determine and regulate the quantity of air delivered through the pipes F and G to the retorts C⁵ and D⁵ in the manner shown. By the use of this regulating and forcing device I dispense with the use of a steam-engine and large expensive blowers, and at same time an automatic regulation of the supplies is maintained.

Referring to Figs. 5 and 6, I add a more detailed description of the arrangement of the regulating and forcing devices and their connections with the series of cupolas heretofore described. The regulating and forcing devices C, E, and R are precisely the same as those described in my application Division B. Steam from the generator B⁴ (see Fig. 5) through the pipe B enters the forcing-chamber E, and carries along the air admitted through the pipe or opening L. It is carried directly to the distributing-receiver C, and the regulating-pipe $t$ takes the pressure from the receiver C to the regulator R. The receiver C is the source of all the pressure which is applied to the delivery of air, vapor, and hydrocarbon liquid to the apparatus. A pipe, G, carries the air directly to the air-supply pipe X' of the cupola A'. A branch pipe carries the air to the pipes communicating with the fire-chambers and ash-pits of all the cupolas and the ash-pit of the vaporizer. A pipe, F, with suitable valve, $f$, from the receiver, carries the air to a heater in the furnace $G^3$, for the purpose of taking up hydrocarbon vapor when it is desired to supply the first cupola with that vapor. Another pipe, J, communicates with a hydrocarbon-liquid tank, T, which is in communication by means of the pipe Y with the vaporizing-chambers in the furnace $G^3$, and from these chambers a pipe, V, carries the vapor to the pipe Y' of the first cupola and to the pipe V'. Y' is in communication with the pipe which supplies the fire-chamber of the first cupola. The pipe V' is also in communication, by a branch, with the pipes which supply the second and third cupolas, by intermediate pipes, (not shown,) so that any of the cupolas at the points hereinbefore described may be supplied with hydrocarbon vapors whenever it may be required in any of the methods of using the apparatus. Another pipe, K, communicates with a hydrocarbon-liquid tank, T', which is provided for supplying hydrocarbon liquid to the cupolas and vaporizer. This communicates with the cupola A' by means of the pipe $A^3$, and with the vaporizer by means of the pipe A. The connections with the cupolas $A^2 A^5$ are not shown, but they are supplied in the manner hereinbefore explained. The steam-generator $B^4$ is also connected directly to the cupolas by pipe $B^3$. Connection between this pipe $B^3$ and the first cupola is made by pipe U', and like connections are to be provided for the second and third cupolas, but which are not shown in the drawings. The pipe $B^3$ is provided with an automatic regulating device, $C^3$, in construction and operation similar to that of the regulator R. There is also a valve, $D^3$, and gage $E^3$, and a superheater, $F^3$, which, by proper valves, may be put into connection with the pipe $B^3$, and may be used or not, as circumstances may require. A branch of $B^3$ is shown at W', which supplies steam to the combustion-chambers of the cupolas. The gas-supply pipes $V^3 Y^3$, $V^4 Y^4$, and $V^8 Y^8$ may be connected with a gas-holder or with their own separate forcing device. All the pipes are provided with gages and valves, so that the operator can by the manipulation of the valves furnish the pressure previously determined upon, and which is thereafter automatically regulated and maintained by means of the automatically-regulated forcing device, (indicated by the letters R, E, C, and $t$.)

It will be understood that by means of the uniform pressure in the distributing-receiver and the valves and pressure-gages on the distributing-pipes any required amount of pressure may be put upon and maintained in the tanks which supply the hydrocarbon liquids, as well as upon the pipes which supply the other materials.

Fig. 6 is the same as Fig. 5, excepting in this respect, that a cupola, $A^6$, is placed in front of the pair of cupolas A' $A^2$, considered in the order of the movement of the materials, while in Fig. 5 the added cupola is placed in the rear. The pipes for the admission of the materials are lettered in the same way, except that the pipes on the right of cupola $A^5$ in Fig. 5 are placed on the left of cupola $A^6$ in Fig. 6. The forcing and regulating devices are the same, and their connections also. A description of the operation of the two forms has been given hereinbefore.

It will be observed that the gaseous, vaporous, and liquid materials used to produce the vapors or gases are supplied to the cupolas and vaporizer under regulated pressure, and may pass under pressure through the apparatus. The heating gases and vapors produced therein may therefore, when required, be supplied therefrom directly to the points of combustion, without the intervention of holders or forcing devices, at the pressure due to the pressure of the boiler, or, by means of my regulators, at pressure of any degree thereunder, as desired. Of course, for illuminating-gases pressure is not required.

Having thus described my invention, I claim—

1. An apparatus for producing gases and vapors, consisting of a cupola having a closed fire-chamber underneath, a grate above the fire-chamber, adapted to support loose mineral, carbonaceous, or equivalent materials, an opening for the admission of such material, a valved smoke-passage, and pipes for the admission of hydrocarbon, steam, air, and gases into the upper part of the cupola and into the fire-chamber, whereby the cupola may be alternately heated and made to vaporize the hydrocarbon and form a mixed vapor or gas, substantially in the manner herein described and set forth.

2. A pair of cupolas, A' $A^2$, with closed fire-chambers, and grates above the fire-chambers, connecting-pipes L' M' above and below, and suitable valves, valved smoke-flues, and hydrocarbon and other necessary liquid, vapor, gas, and air supply pipes, entering the upper part of the cupola, and the fire-chamber, the same for each cupola, the parts being combined and operating substantially in the manner herein described, whereby either cupola may be used as a fixing-retort, for the purpose set forth.

3. A pair of cupolas, A' $A^2$, having closed fire-chambers, and grates above the fire-chambers, with combustion-chambers connected to each other by pipe M', provided with valves, an intermediate vaporizer, and hydrocarbon-supply pipe, the series of pipes connected to each cupola, one set above and the other below the fire-chamber, whereby vaporous and gaseous material may be supplied to the cupolas, the parts specified being constructed, connected, and combined, all substantially in the manner herein described, and for the purpose set forth.

4. A pair of cupolas, A' $A^2$, having closed fire-chambers and valved smoke-flues, with grates above the fire-chambers, and with combustion-chambers connected with each other by pipe M', provided with valves, and with connecting-pipe L' above, and suitable valves, in combination with the vaporizer N', provided with a closed fire-chamber having a grate, a valved escape-pipe, and a surrounding combustion-chamber, all constructed, connected, and operated substantially in the manner herein described, and for the purpose set forth.

5. The combination of the cupolas A' and A², pipes L' M', and the vaporizer N', constructed, connected, and operated substantially in the manner herein described, and for the purpose set forth.

6. The combination of the cupolas A' and A², pipes L' M', and the vaporizer N', and the automatically-regulated forcing devices, constructed, connected, and operated substantially in the manner herein described, and for the purpose set forth.

7. The process of manufacturing and supplying gas which consists in passing, under automatically-regulated pressure and in a downward direction, commingled superheated steam and hydrocarbon vapor through incandescent incombustible mineral or metallic substances heated in a vertical vessel or retort, made steam-tight and of sufficient strength to withstand a high pressure, the said superheated steam and hydrocarbon vapors being decomposed in their said passage, and directly delivering the resultant hydrogen and other gases from the manufacturing apparatus, by the pressure of the boiler in which the steam is generated, to points of consumption, substantially in the manner herein described, and for the purpose set forth.

8. The combination of the cupola A', having a closed combustion-chamber below, a grate above said chamber, supporting loose incombustible material, a valved smoke-flue, a steam-supply pipe having an automatic regulator, a vaporizer, N', having an automatically-regulated liquid-hydrocarbon-supply pipe and an independent heating apparatus, a pipe or pipes connecting the vaporizer and the cupola, and proper discharge-pipe for the commingled vapors, whereby the steam is superheated, is passed to the vaporizer, and caused to take up the hydrocarbon vapors, and the commingled vapors are conducted away, substantially as described.

9. The combination of the cupola A', having a closed combustion-chamber below, a grate above said chamber, supporting loose incombustible materials, a valved smoke-flue, a steam-supply pipe, a liquid-hydrocarbon-supply pipe, and the described automatic regulating and forcing devices, and proper discharge-pipes for the gas or vapor, whereby the incombustible material is alternately heated by means of the fire in the combustion-chamber below and the steam passed through the heated material, all substantially as described and set forth.

10. The combination of the cupola A', having a closed combustion-chamber below, a grate above the combustion-chamber, supporting loose incombustible material, a valved smoke-flue, a steam-supply pipe having an automatic regulator, a vaporizer, N', having a liquid-hydrocarbon-supply pipe, having an automatically-regulated forcing device and an independent heating apparatus, a pipe or pipes connecting the vaporizer and the cupola, a second cupola, A², similar to cupola A', and having like fire-chamber, grate, and incombustible material, and valved pipe or pipes connecting said second cupola to the vaporizer, whereby steam is superheated, caused to take up hydrocarbon vapors, and the commingled vapors converted into fixed gas, all substantially as described.

11. The combination of the cupola A', said cupola having a closed combustion-chamber below and a grate above the combustion-chamber, supporting loose incombustible material, a valved smoke-flue, a steam-supply pipe above the loose materials, a hydrocarbon-supply pipe, an automatic regulator and forcing device for the steam and hydrocarbon liquid, and a second cupola, A², similar to the first, having loose incombustible material and heating-chamber below, and valved pipe or pipes connecting it to the first cupola, and a steam-supply pipe with automatic regulator above the loose material, whereby hydrocarbon and steam may be converted into hydrogen and carbonic oxide, and the commingled hydrogen, carbonic oxide, and steam converted into hydrogen and carbonic acid, ready for separation, all substantially as described.

12. The combination of the cupola A⁶, having a closed combustion-chamber below, a grate above the combustion-chamber, supporting loose incombustible material, a valved smoke-flue, a steam-supply pipe above the said material, a hydrocarbon-supply pipe, automatic regulating devices for the steam and hydrocarbon, a second cupola, A', similar to the first, having a steam-supply pipe with automatic regulator, and valved pipe or pipes between the first and second, a third cupola similar to the first and second, with a vaporizer and hydrocarbon supply between the second and third cupolas, and proper connecting-pipes, whereby steam and hydrocarbon vapor are passed through the cupola and converted into hydrogen and carbonic oxide, the product mixed with steam and converted into hydrogen and carbonic acid, and the separated hydrogen mixed with hydrocarbon vapors and fixed, all substantially as described.

13. The combination of a cupola, A', having a closed combustion-chamber below and a grate above the combustion-chamber, supporting loose incombustible material, a valved smoke-flue, a steam-supply pipe with automatic regulator, a vaporizer connected to the cupola A' by pipe or pipes, a second cupola connected to the vaporizer, similar to the first, and having like loose incombustible materials, a third cupola similar to the first and second, and having like incombustible loose materials, and an automatically-regulated steam-supply pipe, and a purifier, whereby the steam is superheated, made to take up vapor, the mixed steam and vapor converted into hydrogen and carbonic-acid gas, and then separated, all substantially as described.

14. The combination of the cupola A', having a closed combustion-chamber below, a grate above said chamber adapted to support carbonaceous material, a valved smoke-flue, a steam-supply pipe with automatic regulator, a second cupola, A², connected by suitable pipes with cupola A', having a closed combustion-chamber, a grate above for the support of loose incombustible material, a steam-supply pipe with automatic regulator, a proper eduction-pipe for the passage of the mixed hydrogen and carbonic-acid gases, and a purifying apparatus, whereby the steam is converted into hydrogen and carbonic oxide in the first cupola, and the resultant gas and steam converted into hydrogen and carbonic acid in the second cupola, and the carbonic-acid gas afterward removed, all substantially as described and set forth.

15. The combination of the cupola A', having a closed combustion-chamber below, and a grate above the combustion-chamber, supporting loose incombustible material, a valved smoke-flue, an air-supply pipe with automatically-regulated forcing device, a vaporizer, N', having heating apparatus, a second cupola, A², having also above its fire-chamber loose incombustible material, and suitable conducting and connecting pipes, whereby air is heated, caused to take up hydrocarbon vapor, and the air and vapors converted into a fixed gas, all substantially as described.

16. The combination of the cupola A', having a closed combustion-chamber below, and a grate above the combustion-chamber, supporting loose incombustible material, a valved smoke-flue, an air-supply pipe with automatically-regulated forcing device, a vaporizer, N', a second cupola, A², like the first, and containing like incombustible loose materials on its grate, and connected to the first cupola and the intermediate vaporizer, a third cupola like the first and second, and having like incombustible loose materials on its grate, and also a steam-supply pipe with automatic regulator, and, finally, a purifier whereby air is heated, mixed with vapor, and in proper proportions passed through the second cupola and converted into nitrogen and carbonic oxide, and thence mixed with steam and converted into nitrogen, hydrogen, and carbonic acid, and the nitrogen and carbonic-acid gases finally separated, all substantially as described.

17. The combination of the cupola A', having closed combustion-chamber, valved smoke-flue adapted to contain coal, and having an air-supply pipe with automatically regulated forcing device, a second cupola like the first, and connected therewith, but containing incombustible material, and having an air-supply pipe with automatic regulator, and a purifier beyond the second cupola, whereby the air is caused to take up hydrocarbon from the coal and form nitrogen and carbonic oxide, and in the second cupola is converted with the fresh supply of air into nitrogen and carbonic acid, and finally the carbonic-acid gas is removed, all substantially as described.

18. The combination of the cupola A', having closed fire-chamber below, a grate above, adapted to support coal, and having also an air-pipe with automatically-regulated forcing device, and a purifier connected to the cupola, whereby air is converted into nitrogen and carbonic oxide in passing through the coal, and then the nitrogen and carbonic oxide pass through the purifying apparatus to the points of combustion or storage, all substantially as described.

19. The combination of a cupola, A', having a closed combustion-chamber below, and a grate above, adapted to support a mass of coal, an air-supply pipe for the cupola, having automatically-regulated forcing device, a second cupola like the first, and connected to it by a suitable pipe and valve, but having incombustible material on its grate above the fire-chamber, an air or steam supply pipe with automatic regulator for the second cupola, and suitable conveying-pipes, whereby air is passed through incandescent coal and converted into nitrogen and carbonic oxide, and these gases are then, by the addition of air, converted in the second cupola into nitrogen and carbonic-acid gases, all substantially as described.

20. The combination of the cupolas A' A², the first adapted to hold solid hydrocarbon, both having closed fire-chambers below, and their adjuncts, a superheated-steam supply connected to the lower part of the cupola A', and provided with automatic regulator, fire-bricks in cupola A², and a vaporizer having an oil-pipe, the vaporizer being placed between and connected to the cupolas, whereby hydrogen and carbonic oxide from the solid carbon and the hydrocarbon vapor are converted into a fixed gas, substantially as described.

21. The combination of a cupola, A', adapted to hold solid carbon, and having a closed fire-chamber and its necessary adjuncts below, a steam-pipe entering the fire-chamber and provided with an automatic regulator, and the vaporizer N', connected to the upper part of the cupola, and having an automatically-regulated hydrocarbon-oil-supply pipe, substantially as described.

22. The combination of a cupola, A', having fire-bricks or like material above a closed fire-chamber, having its necessary adjuncts, an air-supply pipe in the upper part of the cupola, with automatically-regulated forcing device, a vaporizer having an automatically-regulated oil-supply pipe, said vaporizer being connected to the fire-chamber of the cupola, substantially as described.

23. An apparatus for producing hydrogen gas, consisting of the cupolas A' A², filled with non-combustible material supported above a closed fire-chamber, steam and vapor supply pipes for the cupola A', with automatically-regulated forcing devices, connecting-pipe between the cupolas A' and A², and steam-supply pipe for the cupola A², with automatic regulator, and a purifier whereby the steam and hydrocarbon vapor are converted into hydrogen and carbonic acid and purified, substantially as described.

24. The combination of the cupolas A' A², A' being adapted to hold solid carbon, and both having closed fire-chambers below, an air-pipe communicating to the cupola A' below the solid carbon, with automatically-regulated forcing device, a vaporizer interposed between the two cupolas and connected therewith, having an oil-supply pipe automatically regulated, whereby the air, carbon, and hydrocarbon vapors are converted into fixed air-gas, substantially as described.

25. The combination of the cupolas A⁶ A' A², the first being adapted to hold solid carbon, the second and third having loose fire-brick, and all having closed fire-chambers below, an automatically-regulated steam-pipe communicating with the first cupola below, an automatically-regulated steam-pipe communicating with the second cupola above, a vaporizer between the second and third and connected with the same, and having an oil-supply pipe, and a purifier, P, connected to the third cupola, whereby the steam, carbon, and hydrocarbon vapors are converted into an illuminating hydrogen gas, substantially as described.

26. The cupola A', containing incombustible material, communicating pipes, combined with automatically-regulated forcing device, for the admission of air and hydrocarbon above, and a closed fire-chamber below, whereby air and hydrocarbon are converted into carbonic oxide and nitrogen, substantially as described.

27. The combination of the cupolas A' A², the first having an air-supply pipe opening into the closed fire-chamber below, combined with automatically-regulated forcing device, and adapted to hold solid carbon above the fire-chamber, the second cupola being provided with loose incombustible material or fire-bricks, a pipe connecting the two cupolas at the top, an automatically-regulated steam-supply pipe at the top of the second, and a closed fire-chamber for the second, whereby the air and steam are converted into carbonic-acid gas, nitrogen, and hydrogen, substantially as described.

28. A pair of cupolas, A' A², having closed fire-chambers and grates above the fire-chambers, connected to each other by pipe M', connecting the combustion-chambers, and provided with valves whereby the heating-power of both combustion-chambers can be used in either cupola A' or A², and having air-supply pipes Z³ and Z⁴, connected to the ash-pit, and air-supply pipes W' and W², connected to the combustion-chambers, for the regulated supply of the air required for the perfect combustion of the fuel, and for varying the character of the flame, and also connected to each other by pipe L', connecting the gas and vapor producing chambers, and provided with valves through an intermediate vaporizer having a hydrocarbon-supply pipe, and provided with valves whereby non-illuminating gas from both cupolas can be simultaneously commingled with hydrocarbon vapor, and the gas from one cupola can be mixed with hydrocarbon vapor in its passage through the vaporizer, and then converted into a fixed gas in the second cupola, a series of pipes connected to the cupolas above and below, whereby air and vaporous and gaseous materials are supplied to the cupolas in definite and proportionate quantities at a uniform pressure by means of automatic regulators and regulating forcing devices connected to said pipes, and by means of which a uniform production of any given quality of gas and vapor is obtained, all constructed, connected, and operated substantially in the manner herein described, and for the purpose set forth.

In testimony that I claim the foregoing as my own I affix my signature in presence of two witnesses.

JOSEPH PEARSON GILL.

Witnesses:
WILLIAM HANSON TURTON,
ARTHUR VAN HOESEN.